No. 622,869. Patented Apr. 11, 1899.
G. SMETHURST.
TIME WHEEL MECHANISM.
(Application filed Mar. 14, 1898.)
(No Model.)
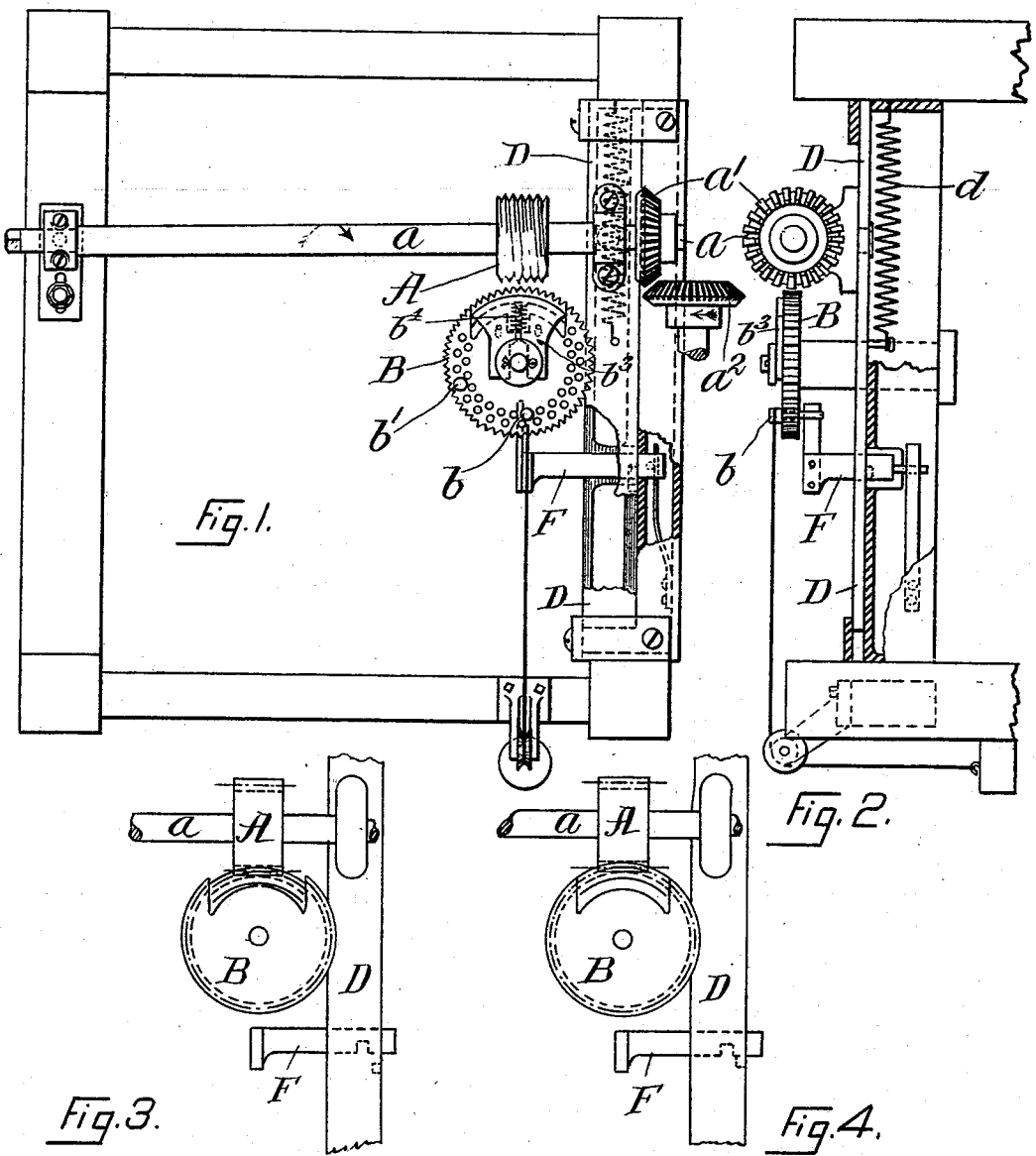
Witnesses:
H. P. Guillo
Wm Maynadier
Inventor:
George Smethurst
By J. E. Maynadier
Attorney.

ced hard together in order to make sure that
UNITED STATES PATENT OFFICE.

GEORGE SMETHURST, OF MAYNARD, MASSACHUSETTS.

TIME-WHEEL MECHANISM.

SPECIFICATION forming part of Letters Patent No. 622,869, dated April 11, 1899.

Application filed March 14, 1898. Serial No. 673,699. (No model.)

*To all whom it may concern:*

Be it known that I, GEORGE SMETHURST, of Maynard, in the county of Middlesex and State of Massachusetts, have invented an Improved Time-Wheel Mechanism, of which the following is a specification, reference being had to the accompanying drawings, in which—

Figure 1 is a plan of a time-wheel mechanism embodying my invention with the worm and gear out of mesh and with certain of the parts broken away for clearness. Fig. 2 is an elevation of Fig. 1 with certain of the parts removed for clearness. Figs. 3 and 4 are diagrams explained below.

In the drawings I have shown parts familiar in mechanisms where a minute accuracy of adjustment is required as to the time during which an operation is to continue, and the particular form of mechanism shown is that part of a mule which regulates the time during which the roving is fed to the spindle. As will be clear to all skilled in machinery for spinning, the worm A is pressed into contact with the gear B by means of slide D, which is locked by bolt F to hold worm A in mesh with gear B, and this motion of slide D also sets shaft $a$ of worm A in rotation by bringing gear $a'$ (fast to shaft $a$) in mesh with a driving-gear $a^2$. In this instance shaft $a$ actuates feed-rolls which feed a roving to a spindle, and the size of the yarn depends upon the time during which shaft $a$ continues to rotate. In order to adjust that time with extreme minuteness, the gear B is provided with two circles of holes, as shown, and a pull-back pin $b$ in one hole determines the starting-point of gear B, while a knockout-pin $b'$ determines the stopping-point of gear B, for as gear B revolves the knockout-pin $b'$ moves bolt F and releases slide D, so that spring $d$ retracts slide D and unmeshes worm A and gear B and also unmeshes gears $a'$ and $a^2$.

This mechanism is familiar in a variety of forms and for a variety of uses, as is well known, with the exception that the gear B cannot yield when pressed upon by gear A, as the slide D is moved to engage bolt F, and my invention consists in means which will permit a worm and its gear or two spur or beveled gears to be pressed together so far as to admit the pitch-line of the gears to temporarily intersect, as shown in the diagram Fig. 3, and thereby make it sure that the catches, the slide D, and the bolt F will be certain to engage, and yet the two gears will be properly in mesh, as shown in diagram Fig. 4, when slide D is close against bolt F. Fig. 3 is a diagram showing gearing A and B in a relation which would be impossible if neither were yielding, and Fig. 4 a diagram showing gears A and B with their pitch-lines held in the proper relation by the catches D and F.

As heretofore made the worm A and gear B had to be pressed together with a good deal of force to enable the slide D to be caught by bolt F, and when slide D was retracted against bolt F the worm A and gear B could not be brought into proper mesh, for although this may be deemed theoretically possible yet practically the backlash of the catches makes it essential that the two gears shall be crowded hard together in order to make sure that the catches will engage, and even then because of the backlash the gears shall be too far apart when the slide is held by the bolt, and the practical result is that the teeth become burred and stunted and the adjustment imperfect, as is well known by all familiar with this sort of mechanism.

What I claim as my invention is—

In a time-wheel mechanism a pair of gears, a slide carrying one of them to bring them into and out of mesh; a bolt to engage the slide and hold the gears in mesh; means to release the slide from the bolt; and means to enable one of the gears to yield when the gears are pressed together, substantially as shown and described.

GEORGE SMETHURST.

Witnesses:
 WM. MAYNADIER,
 JOHN R. SNOW.